INVENTORS:
HANS BECK
JOSEF WAHLANDT

ATT'YS

United States Patent Office 2,940,123
Patented June 14, 1960

2,940,123

SHUT-OFF NOZZLE FOR INJECTION MOLDING OF THERMOPLASTIC MATERIALS

Hans Beck, Ludwigshafen (Rhine), Germany, and Josef Wahlandt, Trelleborg, Sweden, assignors to Badische Anilin- & Soda-Fabrik Aktiengesellschaft, Ludwigshafen (Rhine), Germany Filed July 14, 1958, Ser. No. 748,427

Claims priority, application Germany July 17, 1957

12 Claims. (Cl. 18—30)

This invention is primarily concerned with a new and improved type of nozzle for use in machines for injection molding of thermoplastic materials. More specifically, the invention is concerned with a special type of nozzle in which a needle valve is provided to shut off the orifice of the injection nozzle in answer to the molding rhythm. Still more specifically it is concerned with a nozzle in which the said needle valve is of hollow construction and is provided with channels which extend laterally from the needle valve to the outside of the nozzle assembly establishing a connection between the cavity of the needle valve and a suction or pressure line.

The special purpose of the said improvements in nozzles for injection molding machines is to provide means for evacuating the mold cavity or filling the same with an inert gas or a mold release agent between the molding cycles.

Injection molding machines previously have been disclosed in which the injection nozzle is closed at the orifice by means of a conical needle. The function of the said closing needle is to prevent the plasticized molding material from oozing out or drooling when the orifice of the injection nozzle and the sprue bushing of the mold are detached from one another. Drooling of the plasticized material is caused by the pressure which exists in the nozzle chamber, i.e. the space directly behind the orifice of the nozzle, and which can only be released slowly even when the plunger or the plunger headed conveyor screw is retracted.

It has often been found useful in the injection molding practice to evacuate the mold cavity before the plasticized material is forced in or to fill it with an inert gas or a mold release agent. Evacuating the mold or filling it with an inert gas involves advantages in injection molding when materials highly sensitive to heat are handled or very high temperatures are used at places or throughout the molding process, as burn marks can thus be avoided on the moldings.

The evacuation or filling technique in accordance with our invention allows conventional type molds to be used without the need of special joints. For this purpose the needle valve used for closing the nozzle of the injection molding machine at intervals is made hollow throughout its length and the cavity inside the needle valve is connected via a channel extending laterally from the needle seat to the outside of the injection nozzle, to a suction or pressure line. In order to prevent plasticized material from passing into the needle cavity when the needle valve is in a retracted position, the needle bore should be made capillary near the needle head or be provided with a shut-off means which opens automatically when the needle valve passes into its closing position. When the injection molding machine is operated continuously, the temperature remains practically constant in the nozzle chamber, i.e. that part of the heating cylinder which is in the immediate vicinity of the orifice. The temperature, however, may vary in the said space of the nozzle when the mold is being evacuated via the hollow needle or while a mold release agent is being fed into the mold. For this reason one or more temperature measuring devices, as for example thermocouples may be provided, most preferably in the cavity of the needle valve, where they are not subject to wear or to destruction through the highly compressed plasticized material. Special simplicity in the provision of the temperature measuring devices is afforded when thermocouples are used, as for each thermocouple one wire only, as for example a constantan wire, need be soldered to the inner wall of the hollow needle. In connection with the needle material, thermocouples are thus formed, for example those of the iron-constantan or the Nichrome-constantan type.

The invention will now be described with reference to the accompanying drawing in which.

It is to be understood that these illustrations are by way of example only without any limitation to the particular embodiments shown.

Figure 1:
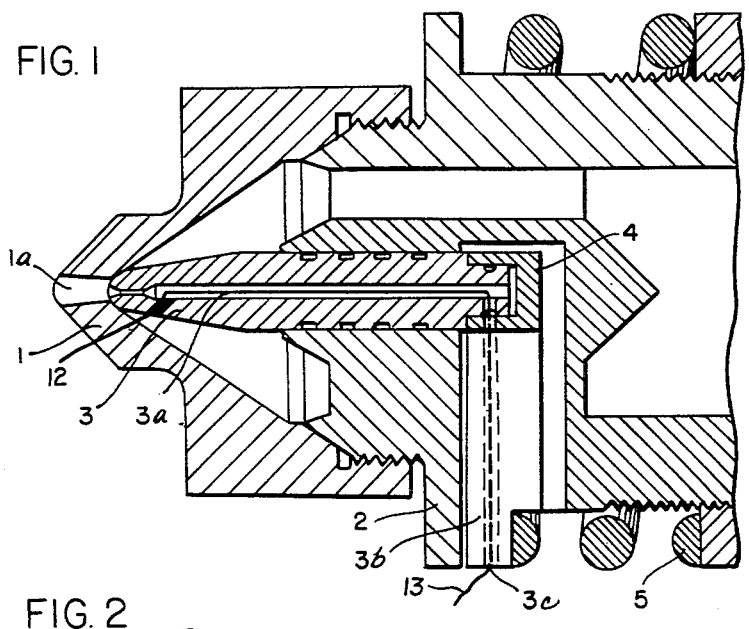
Figure 1 is a longitudinal sectional view of the nozzle of an injection molding machine showing the needle valve in accordance with our invention.

Referring to Figure 1 the nozzle head 1 is screwed on to part 2. The orifice of the nozzle is closed by needle valve 3 which is mounted either fixedly or exchangeably in the needle seat 4. Needle seat 4 has the form of a pin which extends to the outside of the nozzle body and rests upon spring 5. When the plunger is in its rear position, needle valve 3, under the action of spring 5, is forced against the orifice 1a of the injection nozzle closing the same. For evacuating a mold having no connecting pieces of its own through the orifice 1a or for filling a mold with an inert gas or a mold release agent, the needle valve is provided with an axial bore 3a throughout its length, the said bore being constricted to capillary width at the top end of the needle valve. By a channel 3b which laterally extends from needle seat 4 to the outside of the nozzle body, needle bore 3a is connected to a suction or pressure line. Channel 3b, for example, may pass through pin 4. Thermo-couple 12 is conveniently placed near the top end of needle valve 3. Wire 13 serves as a connection to the thermo-coupling element.

Figure 2:
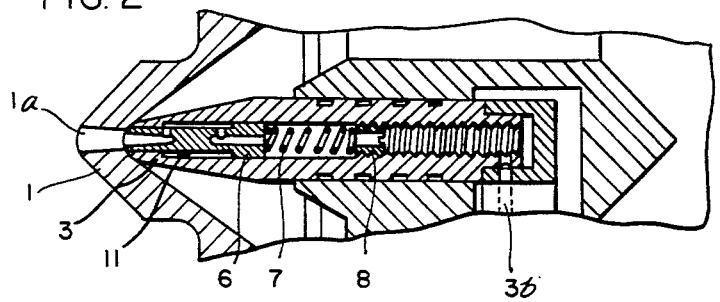
Figures 2 and 3 are detailed sectional views of the needle valve showing two different ways of closing the needle cavity.

In the embodiment of our invention illustrated in Figure 2 the cavity of needle valve 3 is closed by a slide valve 6. Slide valve 6 is spring-loaded (7) in closing direction. Spring 7 in turn is held by an adjustable bolt 8. When slide valve 6 is in the position illustrated in Figure 2, the mold can be aerated through the channels provided in the slide valve, the open needle head and the orifice of the injection nozzle. During the molding operation the needle valve 3, under the pressure of the plasticized material in front of the injection nozzle 1, is shifted rearwards (to the right) out of its closing position, counter to the positive direction of the spring 5 (see also Fig. 1). Under the pressure of spring 7 the head of the slide valve 6 then comes to lie before the orifice of the nozzle and remains in this position until the stop pin 11 strikes an inner collar of needle valve 3, lifting slide valve 6 again from the orifice 1a of the injection nozzle. In this position of the needle valve the channels inside slide valve 6 are closed.

Figure 3:
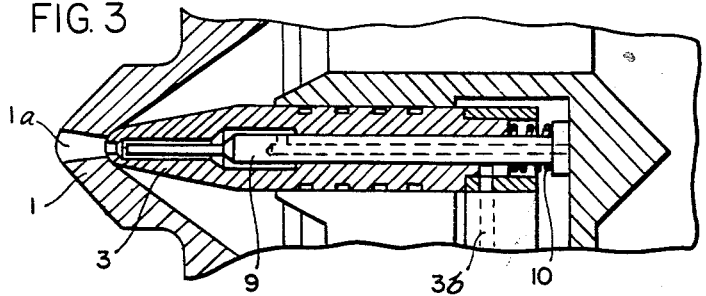

Figure 3 shows the hollow needle valve 3 with a closing cone 9 accommodated inside it. When the orifice 1a of the injection nozzle is closed by the needle valve 3, the closing cone 9, which under the action of spring 10 is always forced rearwards (to the right), leaves the orifice of the nozzle free for aerating the mold. When the injection nozzle 3 is lifted off its seat during the molding operation by the plasticized material, the orifice of the injection nozzle is closed by the closing cone 9.

We claim:

1. An improvement in a shut-off nozzle for thermoplastic material, said nozzle having an opening through which the thermoplastic mass passes from a molding cylinder to a mold, said nozzle also including a spring-loaded needle valve, said needle valve operating to close the nozzle opening when the molding cylinder is decompressed and to release the nozzle opening when the thermoplastic material is to be injected into the mold cavity, the said improvement comprising providing said needle valve with a cavity throughout its length which cavity is connected to a suction or pressure line located outside of the nozzle assembly.

2. A shut-off nozzle as in claim 1 wherein the cavity of the needle valve communicates with the connecting end of a suction and pressure line through a channel which laterally extends from the rearward needle seat to the outside of the nozzle body.

3. A shut-off nozzle as in claim 1 wherein the bore of the needle valve cavity is in the form of a capillary at the top end of said needle valve.

4. A shut-off nozzle as in claim 1 wherein closure means are provided in the cavity of the needle valve whereby said cavity passage is closed when the needle valve is in a retracted position.

5. A shut-off nozzle as in claim 4 wherein the closure means is a slide.

6. A shut-off nozzle as in claim 4 wherein the closure means is a cone.

7. A shut-off nozzle as in claim 1 wherein temperature measuring devices are provided within the cavity of the needle valve.

8. A shut-off nozzle as in claim 7 wherein the temperature measuring device is accommodated near the point where the cavity of the needle valve is closed.

9. A shut-off nozzle as in claim 7 wherein constantan wires are used as a temperature measuring device forming at least one thermocouple together with the material of the needle valve.

10. A shut-off nozzle as in claim 7 wherein the wire is soldered to the wall of the cavity of the needle valve and is led out from the nozzle laterally.

11. A shut-off nozzle as in claim 10 wherein the wire and the material of the needle valve form a thermocouple of the iron-constantan type.

12. A shut-off nozzle as in claim 10 wherein the wire and the material of the needle valve form a thermocouple of the Nichrome-constantan type.

References Cited in the file of this patent

UNITED STATES PATENTS 2,668,985    Babbitt _____ Feb. 16, 1954

FOREIGN PATENTS 912,194    France _____ Apr. 23, 1946